(12) United States Patent
Kim et al.

(10) Patent No.: US 9,382,418 B2
(45) Date of Patent: Jul. 5, 2016

(54) FLAME RETARDANT THERMOPLASTIC RESIN COMPOSITION AND MOLDED ARTICLE COMPRISING THE SAME

(71) Applicant: Samsung SDI Co., Ltd., Yongin-si (KR)

(72) Inventors: Ji Yea Kim, Uiwang-si (KR); Sung Hun Choi, Uiwang-si (KR); Jun Myung Kim, Uiwang-si (KR); Seung Shik Shin, Uiwang-si (KR); Dong Kil Choi, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/632,186

(22) Filed: Feb. 26, 2015

(65) Prior Publication Data

US 2015/0247038 A1  Sep. 3, 2015

(30) Foreign Application Priority Data

Feb. 28, 2014 (KR) .................. 10-2014-0024707
Jan. 9, 2015 (KR) .................. 10-2015-0003680

(51) Int. Cl.
*C08K 5/52* (2006.01)
*C08L 69/00* (2006.01)

(52) U.S. Cl.
CPC ...................... *C08L 69/00* (2013.01)

(58) Field of Classification Search
CPC ........... C08K 3/36; C08L 69/00; C09J 133/08
USPC ........................................... 524/127
See application file for complete search history.

(56) References Cited

U.S. PATENT DOCUMENTS

| 6,355,767 B1 | 3/2002 | Takagi | |
| 2007/0072961 A1* | 3/2007 | Ma et al. | 523/205 |
| 2012/0100377 A1 | 4/2012 | Seidel et al. | |
| 2014/0323625 A1* | 10/2014 | Kim et al. | 524/127 |

FOREIGN PATENT DOCUMENTS

| JP | 2004-35812 A | 2/2004 |
| JP | 2006-342199 A | 12/2006 |
| JP | 2007-269821 A | 10/2007 |
| JP | 2007-308529 A | 11/2007 |
| KR | 10-2011-0059886 A | 6/2011 |

OTHER PUBLICATIONS

Extended European Search Report in commonly owned European Application No. 13189315.8 dated Jul. 17, 2014, pp. 1-5.
Office Action in commonly owned U.S. Appl. No. 14/040,716 mailed Jan. 26, 2015, pp. 1-7.
Final Office Action in commonly owned U.S. Appl. No. 14/040,716 mailed May 29, 2015, pp. 1-5.

* cited by examiner

*Primary Examiner* — Hannah Pak
(74) *Attorney, Agent, or Firm* — Additon, Higgins & Pendleton, P.A.

(57) ABSTRACT

A thermoplastic resin composition and a molded article using the same. The thermoplastic resin composition includes a base resin including a polycarbonate resin and a polysiloxane-polycarbonate copolymer resin, an impact modifier, a phosphorus flame retardant, and inorganic fillers, wherein the inorganic fillers include wollastonite and talc, and the wollastonite has an average diameter of 5 μm to 10 μm and an aspect ratio (diameter:length) of 1:7 to 1:9. The thermoplastic resin composition can exhibit excellent properties in terms of tensile elongation, flexural strength, impact resistance, and balance therebetween.

7 Claims, 1 Drawing Sheet

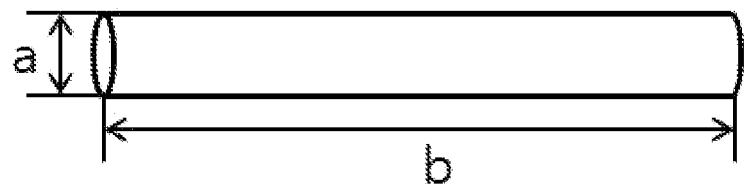

FLAME RETARDANT THERMOPLASTIC RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application 10-2014-0024707, filed on Feb. 28, 2014, and Korean Patent Application 10-2015-0003680, filed on Jan. 9, 2015, the entire disclosure of each of which is incorporated herein by reference.

FIELD OF THE INVENTION

The present invention relates to a flame retardant thermoplastic resin composition and a molded article comprising the same.

BACKGROUND

When a thermoplastic resin or a thermosetting resin is blended with inorganic fillers such as glass fibers, the resin can exhibit enhanced stiffness (flexural properties) such as flexural strength and flexural elasticity by virtue of inherent characteristics of the inorganic fillers. Commonly, blends of a thermoplastic resin such as polycarbonate and inorganic fillers are used for molded articles requiring high stiffness. Particularly, these blends having a flame retardant added thereto are widely used for interior/exterior materials of automobiles, electric/electronic products, and the like, which require flame retardancy, impact resistance, stiffness, and the like.

However, when the (flame retardant) thermoplastic resin is blended with inorganic fillers such as glass fibers, an overall resin composition can have deteriorated fluidity (moldability), and a molded article formed of the same can suffer from deterioration in appearance characteristics due to, for example, protrusion of the inorganic fillers from a surface of the article. In particular, when the resin composition (blend) is used for exterior materials of IT devices in which appearance characteristics are considered an important requirement, protrusion of the inorganic fillers has been regarded as a factor causing a main appearance quality issue. In addition, during injection molding, the resin composition can suffer from distortion due to anisotropy of the inorganic fillers. Accordingly, attempts have been made to use plate type talc, which can solve an anisotropy problem, as inorganic fillers (see Korean Patent Publication No. 2011-0059886).

However, when talc is used as the inorganic filler, usage of the resulting resin composition as exterior materials has limits since there is a concern of deterioration in mechanical properties of the resin composition, such as impact resistance (Izod impact strength), tensile elongation, and the like, due to brittleness of the talc.

In addition, although a thermoplastic resin composition can exhibit improved mechanical properties, impact resistance, and the like by combined use of inorganic fillers with coupling agents, compatibilizers, and the like, the resin composition can become brittle at room temperature with increasing amount of the inorganic fillers, and there is difficulty preventing deterioration in tensile elongation, fluidity, and the like. Moreover, unlike physical properties such as impact resistance and fluidity, it is difficult to improve flexural properties despite use of coupling agents, compatibilizers, and the like.

Therefore, there is a need for a thermoplastic resin composition that can exhibit excellent tensile elongation, flexural strength, flexural elasticity, impact resistance, fluidity, and balance therebetween.

SUMMARY

Embodiments of the present invention provide a flame retardant thermoplastic resin composition which can exhibit excellent tensile elongation, flexural strength, impact resistance, and a balance therebetween, and is eco-friendly because of not using halogen flame retardants; and a molded article comprising the same.

The thermoplastic resin composition includes: a base resin including a polycarbonate resin and a polysiloxane-polycarbonate copolymer resin; an impact modifier; a phosphorus flame retardant; and inorganic fillers, wherein the inorganic filler includes wollastonite and talc, and wherein the wollastonite has an average diameter of about 5 μm to about 10 μm and an aspect ratio (diameter:length) of about 1:7 to about 1:9.

In exemplary embodiments, the impact modifier may be present in an amount of about 1 part by weight to about 20 parts by weight based on about 100 parts by weight of the base resin, the phosphorus flame retardant may be present in an amount of about 1 part by weight to about 40 parts by weight based on about 100 parts by weight of the base resin, and the inorganic fillers may be present in an amount of about 5 parts by weight to about 100 parts by weight based on about 100 parts by weight of the base resin.

In exemplary embodiments, at least some part of a surface of the wollastonite may be subjected to hydrophobic surface treatment.

In exemplary embodiments, a weight ratio of the wollastonite to the talc (wollastonite:talc) may range from about 1:1 to about 10:1.

In exemplary embodiments, the impact modifier may include at least one of a core-shell graft impact modifier and a branched graft impact modifier.

In exemplary embodiments, the phosphorus flame retardant may include an aromatic phosphoric acid ester compound represent by Formula 3:

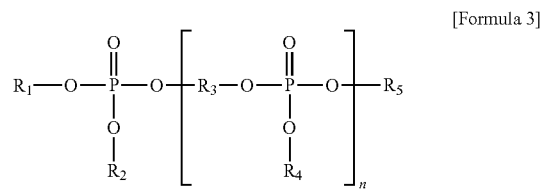

[Formula 3]

wherein $R_1$, $R_2$, $R_4$ and $R_5$ are the same or different and are each independently a hydrogen atom, a $C_6$ to $C_{20}$ aryl group, or a $C_1$ to $C_{10}$ alkyl-substituted $C_6$ to $C_{20}$ aryl group, each $R_3$ is independently a $C_6$ to $C_{20}$ arylene group or a $C_1$ to $C_{10}$ alkyl-substituted $C_6$ to $C_{20}$ arylene group, and n is an integer from 0 to 4.

In exemplary embodiments, the thermoplastic resin composition may have an Izod impact strength of about 5 kgf·cm/cm to about 20 kgf·cm/cm as measured on an about ⅛" thick specimen in accordance with ASTM D256, and a tensile elongation of about 5% to about 20% as measured on an about 3.2 mm thick specimen at an extension rate of about 5 mm/min in accordance with ASTM D638.

Exemplary embodiment of the present invention also relate to a molded article formed from the thermoplastic resin composition.

BRIEF DESCRIPTION OF THE DRAWINGS

FIG. 1 is a schematic view showing diameter a and length b of wollastonite according to one embodiment of the present invention.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to exemplary embodiments of the invention includes: (A) a base resin including (A1) a polycarbonate resin and (A2) a polysiloxane-polycarbonate copolymer resin; (B) an impact modifier; (C) a phosphorus flame retardant; and (D) inorganic fillers.

(A) Base Resin (A1) Polycarbonate Resin

The polycarbonate resin is a thermoplastic polycarbonate resin, for example, an aromatic polycarbonate resin prepared by reacting a carbonate precursor, such as phosgene, halogen formate, or carbonate diester with one or more diphenols (aromatic dihydroxy compounds) represented by the following Formula 1:

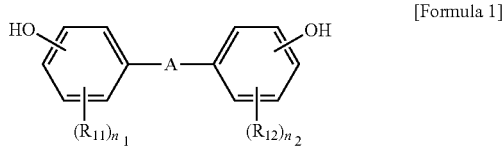

[Formula 1]

wherein A is a single bond, a substituted or unsubstituted $C_1$ to $C_{20}$ alkylene group, a substituted or unsubstituted $C_2$ to $C_5$ alkylidene group, a substituted or unsubstituted $C_5$ to $C_6$ cycloalkylene group, a substituted or unsubstituted $C_5$ to $C_6$ cycloalkylidene group, —CO—, —S—, or —$SO_2$—; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer from 0 to 4.

As used here, the term "substituted" means that one or more hydrogen atoms is substituted with one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof. As used herein, the term "hereto" refers to a nitrogen, sulfur, oxygen, and/or phosphorus atom in place of a carbon atom.

Examples of the diphenols may include without limitation 4,4'-biphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. In exemplary embodiments, the diphenol(s) may include 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane, for example 2,2-bis-(4-hydroxyphenyl)-propane, which is also referred to as bisphenol A.

The polycarbonate resin may include a branched polycarbonate resin and may be prepared, for example, by adding about 0.05 mol % to about 2 mol % of a polyfunctional compound containing tri- or higher functional groups, for example, tri- or higher-valent phenol groups, based on the total amount of the diphenols used in polymerization.

The polycarbonate resin may be used in the form of a homo-polycarbonate resin, a co-polycarbonate resin, or a blend thereof.

In addition, the polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) from about 10,000 g/mol to about 200,000 g/mol, for example, from about 15,000 g/mol to about 50,000 g/mol, without being limited thereto.

Further, the polycarbonate resin may be a mixture of at least two polycarbonate resins having different melt indices (MI) as measured in accordance with ISO 1133 at about 300° C. under a load of about 1.2 kg. For example, the polycarbonate resin may be a mixture of a polycarbonate resin having a melt index from about 1 g/10 min to about 10 g/10 min, a polycarbonate resin having a melt index higher than about 10 g/10 min and less than or equal to about 40 g/10 min, and a polycarbonate resin having a melt index higher than about 40 g/10 min and less than or equal to about 100 g/10 min. Within this range, the thermoplastic resin composition can have excellent moldability (injection fluidity).

In exemplary embodiments, the base resin may include the polycarbonate resin may in an amount of about 10 wt % to about 99 wt %, for example, about 50 wt % to about 99 wt %, based on about 100 wt % of the base resin. In some embodiments, the base resin may include the polycarbonate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate resin can be in a range from about any of the foregoing amounts to about any other of the foregoing amounts.

Within this range, the thermoplastic resin composition can exhibit excellent properties in terms of tensile elongation, stiffness (flexural properties), impact resistance, balance therebetween, and the like.

(A2) Polysiloxane-Polycarbonate Copolymer Resin

The polysiloxane-polycarbonate copolymer resin includes a polycarbonate block and a polysiloxane block. For example, the polysiloxane-polycarbonate copolymer resin may be a triblock copolymer of polycarbonate block/polysiloxane block/polycarbonate block, without being limited thereto. The polysiloxane-polycarbonate copolymer resin may be any typical polysiloxane-polycarbonate copolymer without limitation. For example, the polysiloxane-polycarbonate copolymer resin may be a polysiloxane-polycarbonate copolymer resin prepared by reacting one or more diphenols (aromatic dihydroxy compounds) represented by Formula 1 above with a carbonate precursor and a siloxane compound including a compound represented by the following Formula 2:

[Formula 2]

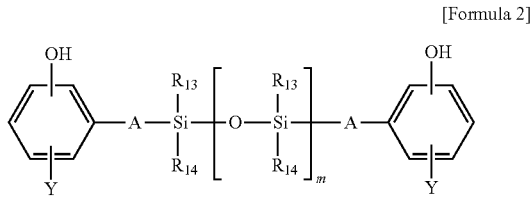

wherein each $R_{13}$ and $R_{14}$ is the same or different and each is independently a $C_1$ to $C_{10}$ alkyl group, $C_6$ to $C_{18}$ aryl group, a halogen atom or $C_1$ to $C_{20}$ alkoxy group-containing $C_1$ to $C_{10}$ alkyl group, or a halogen atom or $C_1$ to $C_{20}$ alkoxy group-containing $C_6$ to $C_{18}$ aryl group; each A is the same or different and each is independently a substituted or unsubstituted $C_2$ to $C_{20}$ hydrocarbon group or a substituted or unsubstituted $C_2$ to $C_{20}$ hydrocarbon group including —O— or —S— in an chain thereof; each Y is the same or different and each is independently a hydrogen atom, a halogen atom, a $C_2$ to $C_{20}$ halogenated alkyl group, a cyano group (—CN), or an ester group; and m ranges from 2 to 100, for example, from 4 to 100, and as another example from 10 to 80.

As used herein, the term "$C_2$ to $C_{20}$ hydrocarbon group" can include without limitation a linear and/or branched $C_2$ to $C_{20}$ alkylene group, a $C_6$ to $C_{20}$ cycloalkylene group, and/or or a $C_6$ to $C_{20}$ arylene group.

In exemplary embodiments, the polycarbonate-polysiloxane copolymer may include about 1 wt % to about 99 wt % of a polycarbonate block derived from one or more diphenols and about 1 wt % to about 99 wt % of a polysiloxane block derived from the siloxane compound. For example, the polycarbonate-polysiloxane copolymer may include about 40 wt % to about 95 wt % of the polycarbonate block and about 5 wt % to about 60 wt % of the polysiloxane block. Within this range, the resin composition can exhibit excellent impact resistance.

In some embodiments, the polycarbonate-polysiloxane copolymer may include a polycarbonate block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of polycarbonate block can be in a range from about any of the foregoing amounts to about any other of the foregoing amounts.

In some embodiments, the polycarbonate-polysiloxane copolymer may include a polysiloxane block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of polysiloxane block can be in a range from about any of the foregoing amounts to about any other of the foregoing amounts.

The polycarbonate-polysiloxane copolymer may have a weight average molecular weight from about 10,000 g/mol to about 50,000 g/mol, for example, from about 15,000 g/mol to about 30,000 g/mol. Further, the polycarbonate-polysiloxane copolymer may have a melt index (MI) from about 5 g/10 min to about 40 g/10 min, for example, from about 10 g/10 min to about 30 g/10 min, as measured in accordance with ISO 1133 at about 300° C. under a load of about 1.2 kg. Within this range, the thermoplastic resin composition can have excellent mechanical properties, injection fluidity, and balance therebetween.

The polycarbonate-polysiloxane copolymer may be prepared by any typical method. For example, the diphenols, the carbonate precursor, and the siloxane compound may be copolymerized by interfacial polycondensation, emulsion polymerization, or the like. Alternatively, the polycarbonate-polysiloxane copolymer may be commercially available products, such as TARFLON RC-1700, FC-1760, made by Idemitsu Co., Ltd.

In exemplary embodiments, the base resin may include the polycarbonate-polysiloxane copolymer resin in an amount of about 1 wt % to about 90 wt %, for example, about 1 wt % to about 50 wt %, based on about 100 wt % of the base resin. In some embodiments, the base resin may include the polycarbonate-polysiloxane copolymer resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the polycarbonate-polysiloxane copolymer resin can be in a range from about any of the foregoing amounts to about any other of the foregoing amounts.

Within this range, the thermoplastic resin composition can have excellent properties in terms of tensile elongation, stiffness (flexural properties), impact resistance, balance therebetween, and the like.

(B) Impact Modifier

The impact modifier may be any impact modifier typically used in thermoplastic resin compositions. Examples of the impact modifier may include without limitation (b1) a core-shell graft impact modifier, (b2) a branched graft impact modifier, or a mixture thereof.

The (b1) core-shell graft impact modifier can be obtained by grafting a vinyl monomer to a core structure of a rubber (rubbery polymer) to form a shell. For example, the core-shell graft impact modifier may be prepared as follows: a core of a rubbery polymer can be prepared by polymerization of at least one rubber, followed by grafting at least one monomer to the rubbery polymer.

Examples of the rubber can include without limitation diene rubbers, acrylate rubbers, silicone monomers, and the like, and mixtures thereof.

The vinyl monomer grafted to the rubbery polymer can be an unsaturated compound. Examples of the vinyl monomers can include without limitation styrene, α-methylstyrene, halogen- and/or $C_1$ to $C_4$ alkyl-substituted styrene, acrylonitrile, methacrylonitrile, $C_1$ to $C_8$ methacrylic acid alkyl esters, $C_1$ to $C_8$ acrylic acid alkyl esters, maleic anhydride, $C_1$ to $C_4$ alkyl- and/or phenyl-nuclear substituted maleimide, and the like, and mixtures thereof.

As used here, the rubber (core) may be present in an amount of about 30 wt % to about 90 wt % based on about 100 wt % of the graft copolymer.

Examples of the diene rubbers may include without limitation butadiene rubbers, ethylene/propylene rubbers, styrene/butadiene rubbers, acrylonitrile/butadiene rubbers, isoprene rubbers, ethylene/propylene/diene terpolymers (EPDM), and the like, and mixtures thereof.

The acrylate rubbers may be prepared (polymerized) from acrylate monomers, such as methyl acrylate, ethyl acrylate, n-propyl acrylate, n-butyl acrylate, 2-ethylhexyl acrylate, hexyl methacrylate, 2-ethylhexyl methacrylate, and the like, and mixtures thereof. In preparation of the acrylate rubbers, ethylene glycol dimethacrylate, propylene glycol dimethacrylate, 1,3-butylene glycol dimethacrylate, 1,4-butylene glycol dimethacrylate, allyl methacrylate, and/or triallyl cyanurate may be used as a curing agent.

The silicone rubbers may be prepared from cyclosiloxane or the like. Examples of the cyclosiloxane may include without limitation hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and mixtures thereof. In preparation of the silicone rubbers, trimethoxymethylsilane, triethoxyphenylsilane, tetramethoxysilane, and/or tetraethoxysilane may be used as a curing agent.

In addition, the rubber may include silicone/acrylate rubbers such as polydimethylsiloxane/butyl acrylate rubber (PDMS/BA), without being limited thereto.

The $C_1$ to $C_8$ methacrylic acid alkyl esters and/or $C_1$ to $C_8$ acrylic acid alkyl esters are esters of methacrylic acid and esters of acrylic acid, respectively, and may be esters prepared from $C_1$ to $C_8$ monohydric alcohols, for example, methyl methacrylate (MMA), ethyl methacrylate, and/or propyl methacrylate.

Examples of the (b2) branched graft impact modifier may include without limitation EPM and/or EPR, which is a copolymer of ethylene and propylene; EPDM which is a terpolymer of ethylene/propylene/diene; allyl methacrylate-butadiene-styrene (MBS); styrene-butadiene-styrene (SBS) triblock copolymer; maleic anhydride-modified EPM (EPM-g-MA); maleic anhydride-modified SBS (SBS-g-MA); maleic anhydride-modified EPDM (EPDM-g-MA); all-acrylic core-shell type rubber; ethylene-ethyl acrylate (EEA); styrene-butadiene rubber (SBR); ethylene-vinyl alcohol (EVOH); various thermoplastics elastomers; plastomers; and the like, and mixtures thereof. For example, the branched graft impact modifier may include EPM, EPDM, EPR, maleic anhydride-modified EPM, maleic anhydride-modified EPDM, maleic anhydride-modified EPR, and the like. In addition, carboxylic acid and/or maleic anhydride may be further used to increase performance of the impact modifier.

In exemplary embodiments, the thermoplastic resin composition may include the impact modifier in an amount of about 1 part by weight to about 20 parts by weight, for example, about 2 parts by weight to about 15 parts by weight, and as another example, about 3 parts by weight to about 8 parts by weight, based on about 100 parts by weight of the base resin. In some embodiments, the thermoplastic resin composition may include the impact modifier in an amount of about 1, 2, 3, 4, 5, 6, 7, 8, 9, 10, 11, 12, 13, 14, 15, 16, 17, 18, 19, or 20 parts by weight. Further, according to some embodiments of the present invention, the amount of the impact modifier can be in a range from about any of the foregoing amounts to about any other of the foregoing amounts.

Within this range, the thermoplastic resin composition can have excellent properties in terms of tensile elongation, stiffness (flexural properties), impact resistance, balance therebetween, and the like.

(C) Phosphorus Flame Retardant

The phosphorus flame retardant may include a typical phosphorus flame retardant used in flame retardant thermoplastic resin compositions. Examples of the phosphorus flame retardant may include without limitation red phosphorus, phosphates, phosphonates, phosphinates, phosphine oxides, phosphazenes, metallic salts thereof, and the like. The phosphorus flame retardants may be used alone or in combination thereof.

In exemplary embodiments, the phosphorus retardant includes an aromatic phosphoric ester compound represented by the following Formula 3:

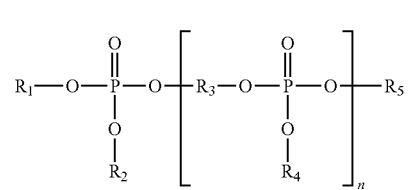

[Formula 3]

wherein $R_1$, $R_2$, $R_4$ and $R_5$ are the same or different and are each independently a hydrogen atom, a $C_6$ to $C_{20}$ aryl group, or a $C_1$-$C_{10}$ alkyl-substituted $C_6$ to $C_{20}$ aryl group; each $R_3$ is independently a $C_6$ to $C_{20}$ arylene group or a $C_1$-$C_{10}$ alkyl-substituted $C_6$ to $C_{20}$ arylene group, for example, derivatives of dialcohol, such as resorcinol, hydroquinone, bisphenol-A, or bisphenol-S; and n is an integer from 0 to 4.

When n is 0 in Formula 3, non-limiting examples of the aromatic phosphoric ester compound represented by Formula 2 may include diaryl phosphate, such as diphenyl phosphate, triphenyl phosphate, tricresyl phosphate, trixylenyl phosphate, tri(2,6-dimethylphenyl)phosphate, tri(2,4,6-trimethylphenyl)phosphate, tri(2,4-di-tert-butylphenyl)phosphate, tri(2,6-dimethylphenyl)phosphate, and the like. In addition, when n is 1 in Formula 3, examples of the compound may include bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], hydroquinone bis[bis(2,4-di-tert-butylphenyl)phosphate], and the like. These compounds may be used alone or in combination thereof.

The thermoplastic resin composition may include the phosphorus flame retardant in an amount of about 1 part by weight to about 40 parts by weight, for example, about 5 parts by weight to about 30 parts by weight, based on about 100 parts by weight of the base resin. In some embodiments, the base resin may include the phosphorus flame retardant in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the phosphorus flame retardant can be in a range from about any of the foregoing amounts to about any other of the foregoing amounts.

Within this range, the resin composition can exhibit improved flame retardancy with minimal or no deterioration of other properties.

(D) Inorganic Filler

The inorganic fillers include wollastonite and talc.

The wollastonite is a white needle-like mineral based on calcium, and at least some part of a surface of the wollastonite may be subjected to hydrophobic surface treatment. As used here, hydrophobic surface treatment may include coating the wollastonite with olefin, epoxy, and/or silane materials, and the like, without being limited thereto.

The wollastonite may have an average diameter from about 5 μm to about 10 μm, for example, about 6 μm to about 9 μm, and an aspect ratio (diameter a:length b) from about 1:7 to about 1:9 (see FIG. 1). If the average diameter a of the wollastonite is less than about 5 μm, there is a concern of deterioration in stiffness (flexural properties) of the thermoplastic resin composition, and if the average diameter of the wollastonite is greater than 10 μm, there is a concern of deterioration in impact resistance of the thermoplastic resin composition. In addition, if the aspect ratio of the wollastonite is less than about 1:7, there is a concern of deterioration in stiffness (flexural properties) of the thermoplastic resin composition, and if the aspect ratio of the wollastonite is greater than about 1:9, there is a concern of deterioration in impact resistance of the thermoplastic resin composition.

The talc may include typical plate type talc. The talc may have an average particle size from about 2 μm to about 7 μm, for example, from about 3 μm to about 5 μm. Within this range, the thermoplastic resin composition can exhibit excellent stiffness (flexural properties).

For reference, the average particle size refers to a median value of particle size distribution measured by X-ray transmission. Specifically, the particle size distribution of the fillers are obtained by X-ray transmission of sinking particles, followed by calculating the median value, thereby obtaining the average particle size.

In one embodiment, commercially available products satisfying the aforementioned conditions, such as size, may be used as the wollastonite and the talc.

In one embodiment, a weight ratio of the wollastonite to the talc (wollastonite:talc) may range from about 1:1 to about 10:1, for example, from about 1:1 to about 3:1. Within this range, it is possible to solve a problem of anisotropy (problem that injection molded articles suffer from bending due to difference between MD shrinkage and TD shrinkage caused by orientation of the fillers), while providing excellent stiffness (flexural properties) to the thermoplastic resin composition.

The thermoplastic resin composition may include the inorganic fillers in an amount of about 5 parts by weight to about 100 parts by weight, for example, about 5 parts by weight to about 70 parts by weight, based on about 100 parts by weight of the base resin. In some embodiments, the base resin may include the inorganic fillers in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 parts by weight. Further, according to some embodiments of the present invention, the amount of the inorganic fillers can be in a range from about any of the foregoing amounts to about any other of the foregoing amounts.

Within this range, the resin composition can exhibit excellent properties in terms of tensile elongation, impact resistance, stiffness (flexural properties), and balance therebetween, with minimal or no deterioration of other properties.

The thermoplastic resin composition may further include one or more typical additives, as needed. Examples of the additives may include without limitation antioxidants, anti-dripping agents, lubricants, release agents, nucleating agents, antistatic agents, stabilizers, pigments, dyes, and the like, and mixtures thereof. When the additives are used, the additives may be present in an amount of about 0.01 parts by weight to about 10 parts by weight based on about 100 parts by weight of the thermoplastic resin composition, without being limited thereto.

In one embodiment, the thermoplastic resin composition may have an Izod impact strength from about 5 kgf·cm/cm to about 20 kgf·cm/cm, for example, from about 5 kgf·cm/cm to about 10 kgf·cm/cm, as measured on an about ⅛" thick specimen in accordance with ASTM D256.

In addition, the thermoplastic resin composition may have a tensile elongation from about 5% to about 20%, for example, from about 8% to about 15%, as measured on an about 3.2 mm thick specimen at an extension rate of about 5 mm/min in accordance with ASTM D638.

In accordance with another exemplary embodiment, a molded article is formed from the above thermoplastic resin composition. The thermoplastic resin composition according to the present invention may be prepared by a method of preparing a thermoplastic resin composition known in the art. For example, the above components and, optionally, other additives can be mixed, followed by melt extrusion in an extruder, thereby preparing a resin composition in the form of pellets. The prepared pellets may be produced into various molded articles (products) through various molding methods, such as injection molding, extrusion, vacuum molding, casting, and the like. Such molding methods are well known to those skilled in the art.

The molded article can exhibit excellent flame retardancy, impact resistance, mechanical properties, and balance therebetween, and accordingly the molded article can be useful for automotive components, components of electric/electronic products, exterior materials and the like. In exemplary embodiments, the molded article is used as a laptop housing.

Hereinafter, the present invention will be described in more detail with reference to the following examples. It should be understood that these examples are provided for illustration only and are not to be construed in any way as limiting the present invention.

EXAMPLES

Details of components used in the following Example and Comparative Examples are as follows:

(A) Base Resin (A1) Polycarbonate Resin (PC-1) An aromatic polycarbonate resin (Samyang Corporation) having a melt index (MI) of 5 g/10 min, as measured at about 300° C. under a load of about 1.2 kg in accordance with ISO 1133 is used.

(PC-2) A bisphenol A-type polycarbonate resin (Cheil Industries) having a melt index (MI) of 20 g/10 min, as measured at about 300° C. under a load of about 1.2 kg in accordance with ISO 1133 is used.

(PC-3) A bisphenol A-type aromatic polycarbonate resin (Cheil Industries) having a melt index (MI) of 62 g/10 min, as measured at about 300° C. under a load of about 1.2 kg in accordance with ISO 1133 is used.

(A2) Polysiloxane-polycarbonate Copolymer Resin (Si-PC)

A polysiloxane-polycarbonate copolymer resin (Idemitsu Co., Ltd.) having a melt index (MI) of 20 g/10 min, as measured at about 300° C. under a load of about 1.2 kg in accordance with ISO 1133 is used.

(B) Impact Modifier

Impact modifier (S-2001, MRC Co., Ltd.) composed of a core PDMS/BA and a shell formed from MMA is used.

(C) Phosphorus Flame Retardant

Bisphenol-A bis(diphenylphosphate) (BDP) (CR-741, DAIHACHI Chemical Industry Co., Ltd.) is used.

(D) Inorganic Filler (D1) Wollastonite (D1-1) Wollastonite (NYGLOS 4W, NYCO Minerals Inc.) having an average particle size (diameter×length) of 7 μm×63 μm (aspect ratio (diameter:length): 1:9) is used.

(D1-2) Wollastonite (NYGLOS 8, NYCO Minerals Inc.) having an average particle size (diameter×length) of 12 μm×156 μm (aspect ratio (diameter:length): 1:13) is used.

(D1-3) Wollastonite (NYGLOS 12, NYCO Minerals Inc.) having an average particle size (diameter×length) of 15 μm×150 μm (aspect ratio (diameter:length): 1:10) is used.

(D1-4) Wollastonite (NYGLOS 20, NYCO Minerals Inc.) having an average particle size (diameter×length) of 30 μm×300 μm (aspect ratio (diameter:length): 1:10) is used.

(D2) Talc

Plate type talc (UPN HS-T 0.5, HAYASHI Chemical) is used.

Example 1 and Comparative Examples 1 to 3

According to compositions and amounts as listed in Table 1, the components are introduced into a 44 L/D twin-screw type extruder having a diameter of 45 mm, followed by melting and extrusion at 250° C. at a stirring speed of 250 rpm, thereby preparing pellets. The prepared pellets are dried at 80° C. for 5 hours or more, followed by injection molding using a screw type injection machine (150 t single injection machine) at 240° C. to 280° C., thereby preparing a specimen. The prepared specimen is evaluated as to the following properties, and results are shown in Table 1.

Property Evaluation (1) Izod impact strength (unit: kgf·cm/cm): Izod impact strength is measured on ⅛" thick notched Izod specimens in accordance with ASTM D256.

(2) Tensile elongation (unit: %): Tensile elongation is measured on 3.2 mm thick specimens at an extension rate of 5 mm/min in accordance with ASTM D638.

(3) Spiral flow: Prepared pellets are injection molded into a 2 mm thick spiral-shape mold under the conditions of a molding temperature of 300° C., a mold temperature of 60° C., injection pressure of 1,500 kg/cm², and injection speed of 120 mm/s, using an injection molding machine (LGE 110 II, LS Mtron Co., Ltd.), followed by measuring length (mm) of the injection molded specimens.

(4) Flexural strength (unit: kgf/cm²): Flexural strength is measured on 3.2 mm thick specimens at a rate of 2.8 mm/min in accordance with ASTM D790.

TABLE 1

| | | | Example 1 | Comparative Example 1 | Comparative Example 2 | Comparative Example 3 |
|---|---|---|---|---|---|---|
| (A) | (A1) | PC-1 (wt %) | 50 | 50 | 50 | 50 |
| | | PC-2 (wt %) | 12 | 12 | 12 | 12 |
| | | PC-3 (wt %) | 28 | 28 | 28 | 28 |
| | (A2) | Si-PC (wt %) | 10 | 10 | 10 | 10 |
| (B) (parts by weight) | | | 6 | 6 | 6 | 6 |
| (C) (parts by weight) | | | 19 | 19 | 19 | 19 |
| (D1) | Kind | | NYGLOS 4W | NYGLOS 8 | NYGLOS 12 | NYGLOS 20 |
| | Parts by weight | | 37.7 | 37.7 | 37.7 | 37.7 |
| (D2) (parts by weight) | | | 5.1 | 5.1 | 5.1 | 5.1 |
| Izod impact strength (kgf·cm/cm) | | | 8.6 | 7.6 | 6.8 | 5.7 |
| Tensile elongation (%) | | | 10.3 | 7.3 | 5.9 | 4.6 |
| Spiral Flow (mm) | | | 225 | 215 | 217 | 207 |
| Flexural strength (kgf/cm2) | | | 58,995 | 56,634 | 57,817 | 58,557 |

(parts by weight: based on 100 parts weight of base resin (A))

From Table 1, it can be seen that the flame retardant thermoplastic resin composition according to the present invention exhibits excellent impact resistance (Izod impact strength), tensile elongation, flexural strength, and the like, and has excellent spiral flow (moldability) during injection molding.

Conversely, it can be seen that the thermoplastic resin composition of Comparative Examples suffer from deterioration in impact resistance, tensile elongation, and the like.

Many modifications and other embodiments of the invention will come to mind to one skilled in the art to which this invention pertains. Therefore, it is to be understood that the invention is not to be limited to the specific embodiments disclosed and that such modifications and other embodiments are intended to be included within the scope of the appended claims.

What is claimed is:

1. A thermoplastic resin composition comprising: a base resin comprising a polycarbonate resin and a polysiloxane-polycarbonate copolymer resin; an impact modifier; a phosphorus flame retardant; and inorganic fillers, wherein the inorganic fillers comprise wollastonite and talc, and the wollastonite has an average diameter of about 5 μm to about 10 μm and an aspect ratio (diameter:length) of about 1:7 to about 1:9, wherein the thermoplastic resin composition has a tensile elongation from about 8% to about 20% as measured on an about 3.2 mm thick specimen at an extension rate of about 5 mm/min in accordance with ASTM D638, and wherein a weight ratio of the wollastonite to the talc (wollastonite:talc) ranges from about 1:1 to about 10:1.

2. The thermoplastic resin composition according to claim 1, wherein the impact modifier is present in an amount of about 1 part by weight to about 20 parts by weight based on about 100 parts by weight of the base resin, the phosphorus flame retardant is present in an amount of about 1 part by weight to about 40 parts by weight based on about 100 parts by weight of the base resin, and the inorganic fillers are present in an amount of about 5 parts by weight to about 100 parts by weight based on about 100 parts by weight of the base resin.

3. The thermoplastic resin composition according to claim 1, wherein at least part of a surface of the wollastonite is subjected to hydrophobic surface treatment.

4. The thermoplastic resin composition according to claim 1, wherein the impact modifier comprises at least one of a core-shell graft impact modifier and a branched graft impact modifier.

5. The thermoplastic resin composition according to claim 1, wherein the phosphorus flame retardant comprises an aromatic phosphoric acid ester compound represent by Formula 3:

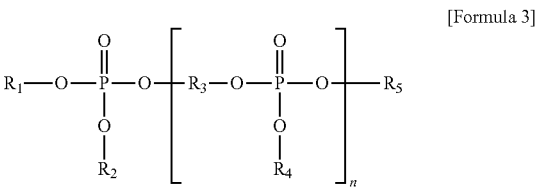

[Formula 3]

wherein $R_1$, $R_2$, $R_4$ and $R_5$ are the same or different and are each independently a hydrogen atom, a $C_6$ to $C_{20}$ aryl group, or a $C_1$ to $C_{10}$ alkyl-substituted $C_6$ to $C_{20}$ aryl group, each $R_3$ is independently a $C_6$ to $C_{20}$ arylene group or a $C_1$ to $C_{10}$ alkyl-substituted $C_6$ to $C_{20}$ arylene group, and n is an integer from 0 to 4.

6. The thermoplastic resin composition according to claim 1, wherein the thermoplastic resin composition has an Izod impact strength from about 5 kgf·cm/cm to about 20 kgf·cm/cm as measured on an about ⅛" thick specimen in accordance with ASTM D256.

7. A molded article formed from the thermoplastic resin composition according to claim 1.

\* \* \* \* \*